Feb. 21, 1956 D. G. BOOTH ET AL 2,735,372
GEAR PUMP OR MOTOR
Filed May 20, 1952
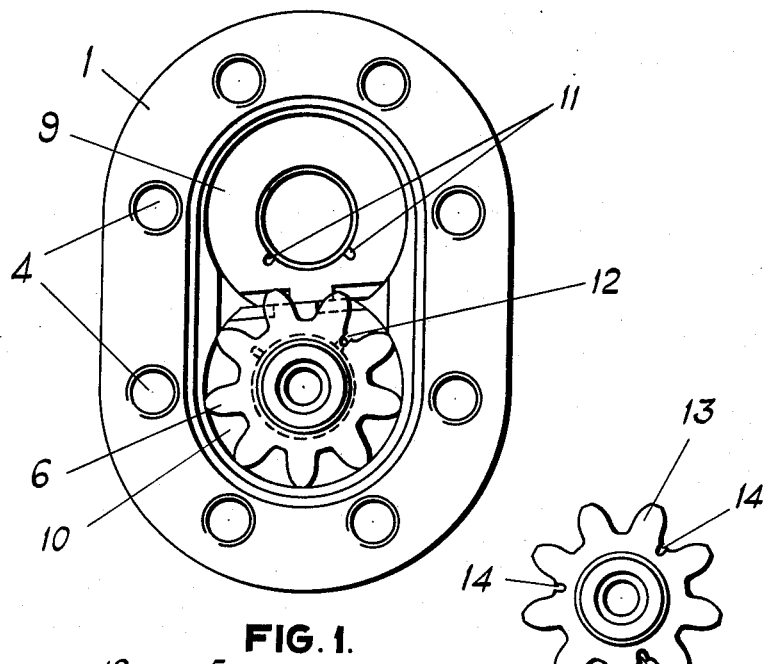
FIG. 1.
FIG. 3.
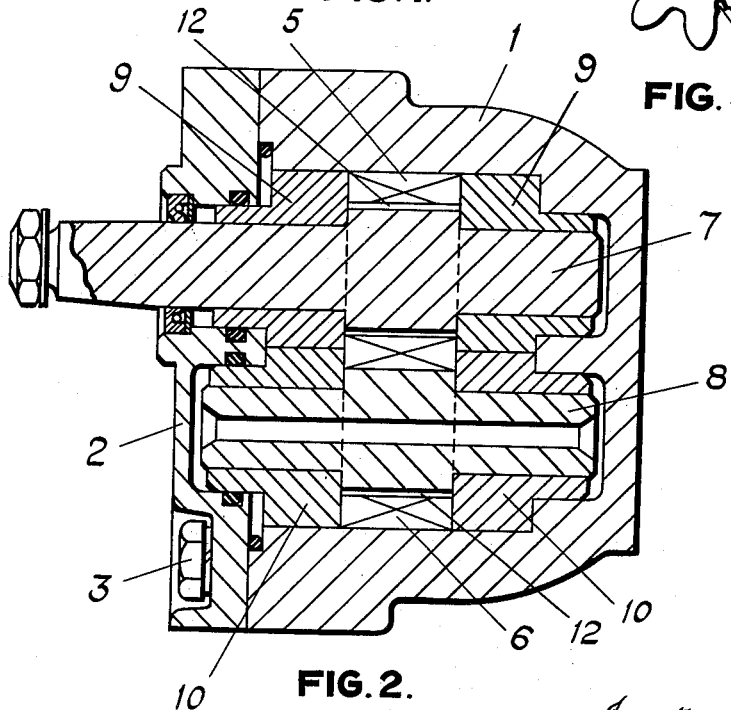
FIG. 2.
Inventors:-
Douglas Gerhard Booth,
Frederick Baines,
By:- William E. P. Bayly
Attorney.

United States Patent Office 2,735,372
Patented Feb. 21, 1956

2,735,372

GEAR PUMP OR MOTOR

Douglas Gerhard Booth and Frederick Baines, Ilford, England, assignors to The Plessey Company Limited, Ilford, England, a British company Application May 20, 1952, Serial No. 288,902

3 Claims. (Cl. 103—126)

This invention relates to gear pumps or motors.

It has previously been proposed to supply a lubricant between the journal bearings and gear faces by means of a portion of the fluid passing through pump or motor being diverted through a radial groove in the face of the journal bearing, this said groove extends beyond the root diameter of the gear with the result a supply of lubricant is taken from the pump or motor as each root diameter passes the groove.

An object of the present invention is to reduce the quantity of fluid which is required for lubricating the journals to a minimum, and at the same time maintain a high volumetric efficiency of the pump or motor.

Another object of the invention is the provision of passageways symmetrically disposed on the face of the bearing to enable the pump to be used for either direction of rotation without modification of the bearings.

According to this invention the gear pump has a pump chamber formed therein, said housing having an inlet leading to and an outlet leading from the pump chamber, a pair of intermeshing gears in said pump chamber for pumping liquid from said inlet to said outlet, said gears having axially extended journals, bearing bushes carried in said housing supporting said journals and sealably engaging the corresponding gear side faces, said gears having at least one slot between the teeth extending entirely through the gear from one face to the other parallel to the axis of said gear, said bushes facing the respective gear side faces having a radial groove adjacent to the outlet extending from the bore of the bearing and the axial extent of the slot in the space between the teeth whereby lubricant can be forced therethrough at high pressure when the slot and groove are coincident.

An advantage of the invention enables the required amount of circulating fluid to be metered to the journals in the form of intermittent injections, the number of which is proportional to the speed of rotation of the pump or motor. One advantage of this invention is that the quantity of fluid which is required for lubricating the journals may be controlled at a minimum value while still retaining the maximum groove dimension.

These parts of the bearings which are in proximity to the high pressure fluid in the pump may have one or more grooves incorporated in the bearing faces. A slot is incorporated in the pump rotors of such dimensions as to overlap the one or more grooves in the bearings, when both are co-incident. When the rotor slot and a pump groove are co-incident a portion of the high pressure circulation fluid is injected into the bearings. Thus, for example, if there are two grooves in the bearing adjacent to the H. P. side or two grooves in the gear, lubricant is forced therethrough twice for every revolution of the gears.

In order that the invention may be clearly understood a preferred embodiment will now be described with reference to the accompanying drawing in which—

Fig. 1 is an end elevation with parts removed to illustrate more clearly the invention.

Fig. 2 is a side view in section, and partly in elevation of a gear pump, and

Fig. 3 shows an alternative form of gear wheel.

The gear pump comprises a pump casing 1 having a removable cover plate 2 at one end, the cover plate 2 being secured in position by a ring of screws 3 which are screwed into tapped holes 4 in the end of the pump casing 1.

The pump gears 5 and 6 are formed integrally with shafts 7 and 8 respectively, the shaft 7 of the gear 5 being extended to project through the end cover plate 2 and adapted to be connected in driving engagement with an electric motor or other driving source.

The gear shafts 7 and 8 are supported on either side of the associated gears by bearings 9 and 10, said bearings are in axially floating engagement with side faces of the gears 5 and 6 the interior of the pump casing being machined to provide parallel intersecting chambers in which the gears are housed. The bearings 9 and 10 have flat surfaces of adjacent bearings in contact with one another and situated on the line of intersection between adjacent chambers.

In accordance with the invention there is arranged in the end of each bearing facing the respective gears 5 and 6 two radial grooves 11 extending from bearing bore which terminate before reaching the root diameter of the gear, one terminating at the pressure side of the pump and one at the suction side. Each gear 5, 6 has a transverse slot 12 in the space between two teeth extending entirely through the gear from one face to the other which terminates before reaching the bore of the bearing, but is of sufficient depth to overlap the groove 11.

When the slots 12 in the gears 5 and 6 are co-incident with the groove 11 in the faces of the bearings on the pressure side of the pump, fluid is injected into the bore of the bearing once per revolution.

The quantity of fluid which is injected into the bore of the bearing may be governed by varying the dimensions of the groove 11 and slot 12. This arrangement permits the requisite amount of circulating fluid to be intermittently injected into the bearings.

In Fig. 3, the pump gear 13 has three slots 14 spaced at an equal distance apart, so that when used in a pump with a bearing as shown in Fig. 1, there are three injections per revolution.

The one or more effective radial grooves extend towards the pressure side of the pump and are of such length that they are normally obturated by the end face of the gears but so disposed that they provide a passage for the pressure fluid when they are coincident with the slot or slots provided in the gear.

The invention has been described with the gears each having one or more slots and the bearings two radial slots, but it is to be understood that the number of slots and radial grooves may be varied, thus, for example, the bearings may have several radial slots.

We claim:

1. In a gear pump housing having a pump chamber formed therein, said housing having an inlet leading to and an outlet leading from the pump chamber, a pair of intermeshing gears in said pump chamber for pumping liquid from said inlet to said outlet, said gears having axially extended journals, bearing bushes carried in said housing supporting said journals and sealably engaging the corresponding gear side faces, said gears having at least one slot between the teeth extending entirely through the gear from one face to the other parallel to the axis of said gear, said bushes facing the respective gear side faces having a radial groove adjacent to the outlet extending from the bore of the bearing and the axial extent of the slot in the space between the teeth.

2. In a gear pump a housing having a pump chamber formed therein, said housing having an inlet leading to and an outlet leading from the pump chamber, a pair of intermeshing gears in said pump chamber for pumping liquid from said inlet to said outlet, said gears having axially extended journals, bearing bushes carried in said housing supporting said journals and sealably engaging the corresponding gear side faces, said gears having at least one slot between the teeth extending entirely through the gear from one face to the other parallel to the axis of said gear, said bushes facing the respective gear side faces having a radial groove adjacent to the inlet leading to the pump chamber and radial groove adjacent to the outlet leading from the pump chamber, extending from the bore of the bearing and the axial extent of the slot in the space between the teeth.

3. In a gear pump a housing having a pump chamber formed therein, said housing having an inlet leading to and an outlet leading from the pump chamber, a pair of intermeshing gears in said pump chamber for pumping liquid from said inlet to said outlet, said gears having axially extending journals, bearing bushes carried in said housing supporting said journals and sealably engaging the corresponding gear side faces, said bearings having flats on adjacent surfaces in contact with one another, said gears having at least one slot between the teeth extending entirely through the gear from one face to the other parallel to the axis of said gear, said bushes facing the respective gear side faces having radial grooves adjacent to the inlet leading to and outlet leading from the pump chamber respectively extending from the bore of the bearing to overlapping facial contact with the slot in the gears.

References Cited in the file of this patent

UNITED STATES PATENTS

| | | |
|---|---|---|
| 1,271,970 | Wood | July 9, 1918 |
| 1,550,099 | Sayre | Aug. 18, 1925 |
| 1,682,842 | Hamer | Sept. 4, 1928 |
| 1,913,633 | Heil et al. | June 13, 1933 |
| 1,972,271 | McIntyre | Sept. 4, 1934 |
| 1,981,619 | Gee | Nov. 20, 1934 |
| 2,391,072 | Pugh | Dec. 18, 1945 |
| 2,471,149 | Girz | May 24, 1949 |
| 2,487,732 | Schanzlin | Nov. 8, 1949 |